United States Patent [19]

Kobayashi et al.

[11] Patent Number: 5,309,784
[45] Date of Patent: May 10, 1994

[54] SHIFT APPARATUS

[75] Inventors: Satoshi Kobayashi, Isehara; Sadahiro Kawahara, Ebina; Hiroshi Yamazaki; Takumi Watanabe, both of Yokohama; Yasushi Asano; Yoshimasa Kataumi, both of Kosai, all of Japan

[73] Assignees: Nissan Motor Co., Ltd.; Ohi Seisakusho Co., Ltd., both of Yokohama; Fuji Kiko Co., Ltd., Tokyo, all of Japan

[21] Appl. No.: 56,631

[22] Filed: May 4, 1993

[30] Foreign Application Priority Data

May 8, 1992 [JP] Japan .................. 4-116347

[51] Int. Cl.$^5$ .................................. B60K 20/00
[52] U.S. Cl. ............................... 74/475; 74/527
[58] Field of Search ................. 74/475, 527, 531

[56] References Cited

U.S. PATENT DOCUMENTS

| | | | |
|---|---|---|---|
| 4,338,828 | 7/1982 | Ruhlman | 74/475 |
| 4,365,522 | 12/1982 | Kubota et al. | 74/475 |
| 4,646,582 | 3/1987 | Kijima | 74/745 X |
| 4,648,283 | 3/1987 | Janson | 74/475 X |
| 5,044,221 | 9/1991 | Suzuki et al. | 74/475 |
| 5,079,966 | 1/1992 | Ishizuki et al. | 74/473 R |
| 5,156,061 | 10/1992 | Ishizuki et al. | 74/475 |

FOREIGN PATENT DOCUMENTS

| | | |
|---|---|---|
| 3048093 | 9/1981 | Fed. Rep. of Germany . |
| 3116833 | 2/1982 | Fed. Rep. of Germany . |
| 3602157 | 7/1987 | Fed. Rep. of Germany . |
| 3923508 | 1/1991 | Fed. Rep. of Germany . |
| 2-80844 | 3/1990 | Japan ............ 74/475 |
| 2-199359 | 8/1990 | Japan ............ 74/475 |
| 2100374 | 12/1982 | United Kingdom . |
| 2233052 | 1/1991 | United Kingdom . |

Primary Examiner—Allan D. Herrmann
Assistant Examiner—David W. Laub
Attorney, Agent, or Firm—Lowe, Price, LeBlanc & Becker

[57] ABSTRACT

A gear shift apparatus includes a shaft having a first axis extending laterally with respect to a vehicle body. A bracket is secured to a pivot pin rotatable about a second axis extending laterally with respect to the first axis. A gear shift lever is secured to the bracket for unitary rotation therewith about the second axis. A sleeve is fixed to the gear shift lever for unitary motion therewith. A check ball is supported by the sleeve and urged against a cam surface of a stationary position plate. The cam surface has a plurality of recesses engaged with the check ball.

9 Claims, 3 Drawing Sheets

SHIFT APPARATUS

BACKGROUND OF THE INVENTION

The present invention relates to a shift apparatus including a gear shift lever, a check member and a position plate cooperating with the check member, for use in a vehicle, for example, a vehicle having an automatic transmission.

U.S. Pat. No. 4,365,522 issued on Dec. 28, 1982 to Kubota, U.S. Pat. No. 5,079,966 issued on Jan. 14, 1992 to Ishizuki, and U.S. Pat. No. 5,156,061 issued on Oct. 20, 1992 to Ishizuki, disclose shift apparatus for automatic transmission vehicles, each of which includes a gear shift lever rotatably supported about an axis on a vehicle body. A check member is coupled with the gear shift lever and cooperates with a position plate.

U.S. Pat. No. 5,044,221 issued on Sep. 3, 1991 discloses a shift apparatus for automatic transmission vehicles, which includes a gear shift lever slidable along a cranked guide slot formed on a console box secured to a vehicle body. A pivotal latch member is confined by a check mechanism so as to hold the gear shift lever without play in the guide slot.

SUMMARY OF THE INVENTION

An object of the present invention is to provide an improved shift apparatus capable of controlling a gear shift lever so as to rotatable in a universal direction with respect to a vehicle body while keeping a check member in contact with a position plate.

According to one aspect of the present invention, there is provided a shift apparatus comprising:

a shaft having a predetermined first axis and rotatable about said predetermined first axis;

a bracket;

a gear shift lever secured to said bracket for unitary motion therewith;

a sleeve fixed to said gear shift lever for unitary motion therewith;

a check ball supported by said sleeve;

a stationary position plate with a cam surface cooperating with said check ball; and means for supporting said bracket on said shaft which may include a pivot pin tilt about a second axis extending laterally with respect to said predetermined first axis in such a manner as to keep said check ball in contact with said cam surface.

DESCRIPTION OF THE PREFERRED EMBODIMENT

Figure 1:
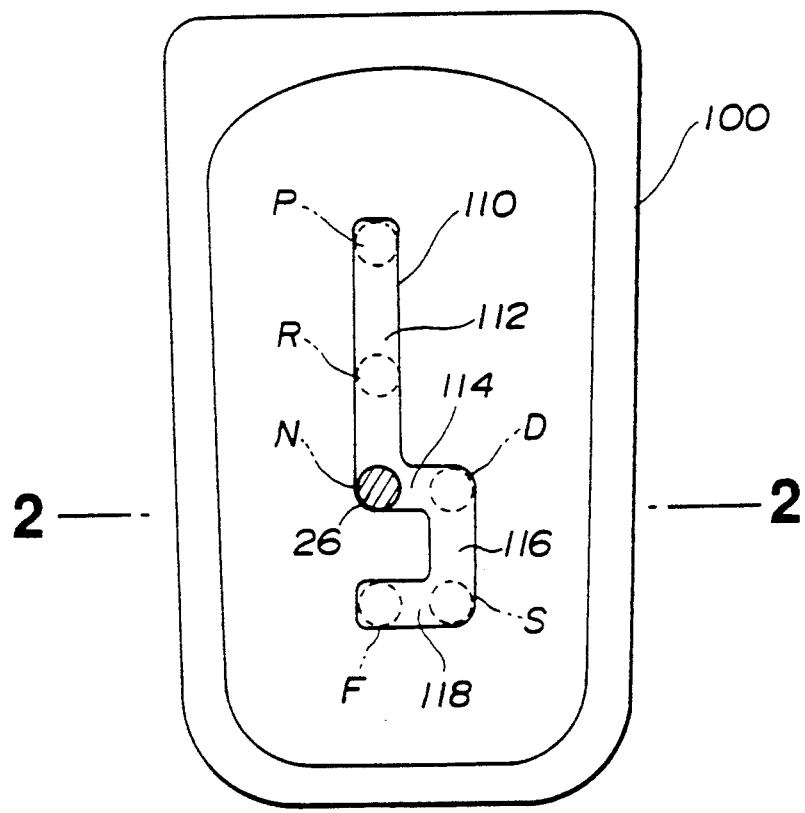
FIG. 1 is a top plan view of a console box of a shift apparatus according to the present invention, showing a cranked guide slot.

Referring now to FIG. 1, there is shown a top wall of a console box 100 secured to a vehicle body. The top wall is formed with a cranked guide slot 110 through which a gear shift lever 26 projects upwardly so as to be movable therealong. As shown in FIG. 1, the cranked guide slot 110 includes a longitudinal longer part 112, a longitudinal shorter part 116 connected through a lateral part 114, and a lateral part 118 extending from an end of the longitudinal shorter part 116. Arranged along the cranked guide slot 110 are operational shift positions of the gear shift lever 26, which include a parking position "P", a reverse position "R", a neutral position "N", a drive position "D", a first speed position "F" and a second speed position "S" as indicated in phantom circle lines in FIG. 1. The operational shift positions "P" to "S" correspond to gear positions of an automatic transmission (not shown) to which the gear shift lever 26 is connected. The shift positions "P", "R" and "N" are disposed in the longitudinal longer part 112. The shift position "D" is disposed at the joint corner of the lateral part 114 and the longitudinal shorter part 116 and the shift position "S" is at the joint corner of the longitudinal shorter part 116 and the lateral part 118. The shift position "F" is disposed at the end of the lateral part 118.

Figure 2:
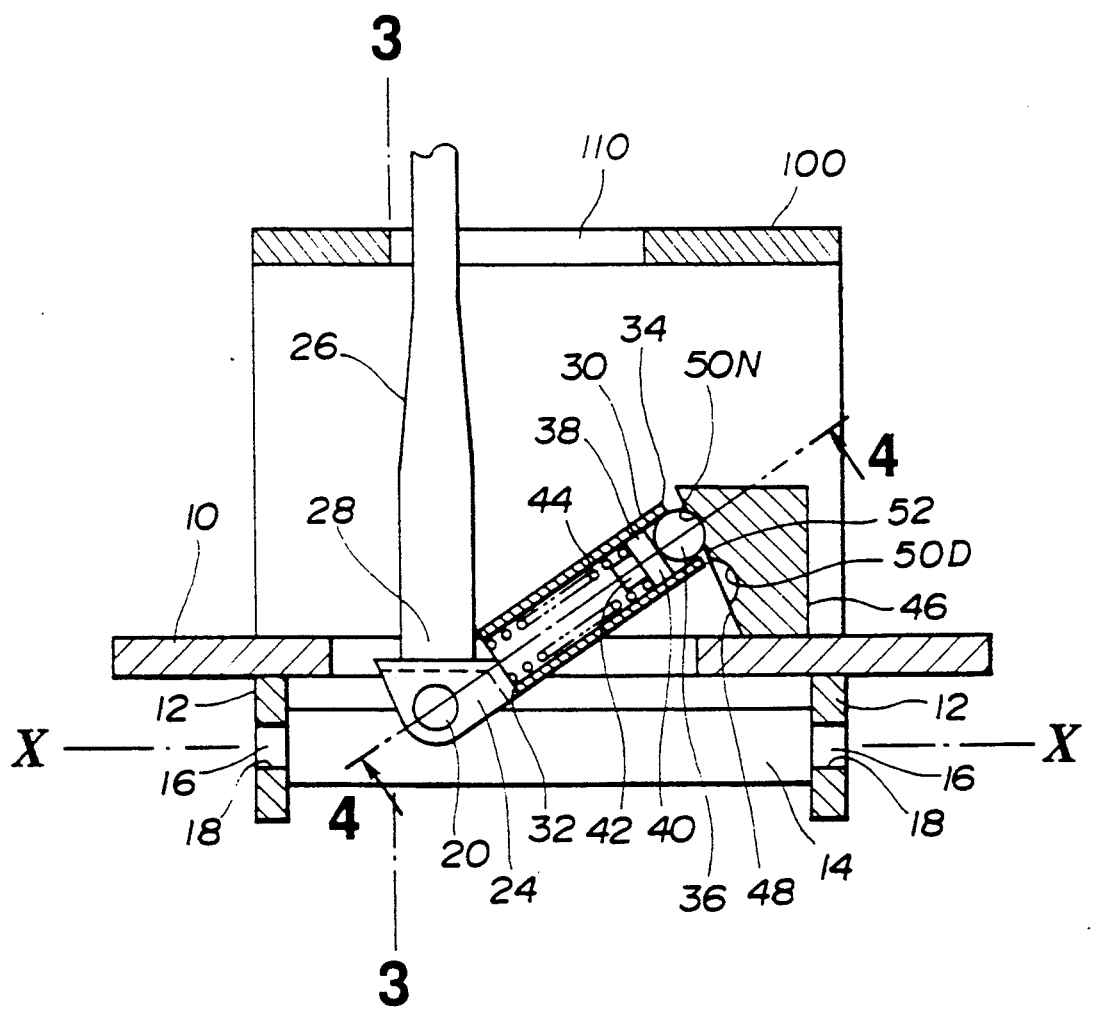
FIG. 2 is a sectional view, partially broken away, of the shift apparatus, taken along the line 2—2 of FIG. 1, showing a gear shift lever in a neutral position.

As shown in FIG. 2, a shaft 14 is disposed between two opposed brackets 12, 12 secured to a base plate 10 of the vehicle body. The shaft 14 has a first axis X extending in a lateral or transverse direction with respect to the vehicle body. The shaft 14 has small-diameter portions 16, 16 projecting outwardly from opposite sides thereof and inserted into through-holes 18, 18 which are formed on the brackets 12, 12. Thus, the shaft 14 is rotatably supported on the brackets 12, 12.

Figure 3:
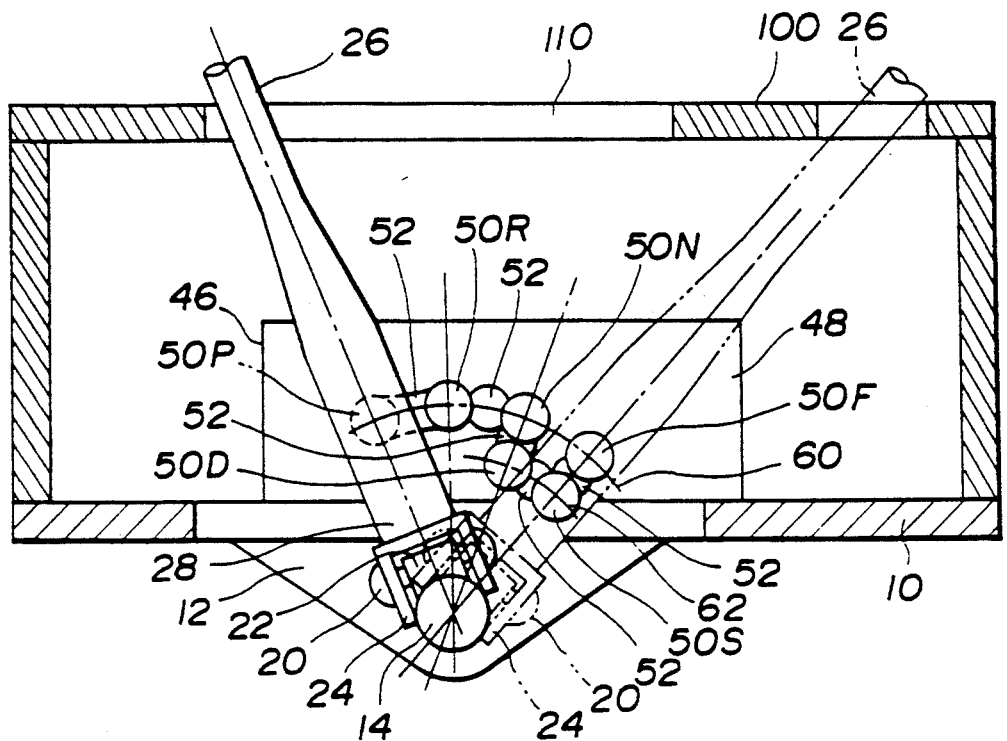
FIG. 3 is a sectional view of the shift apparatus, taken along the line 3—3 of FIG. 2, showing the gear shift lever in a parking position.
Figure 4:
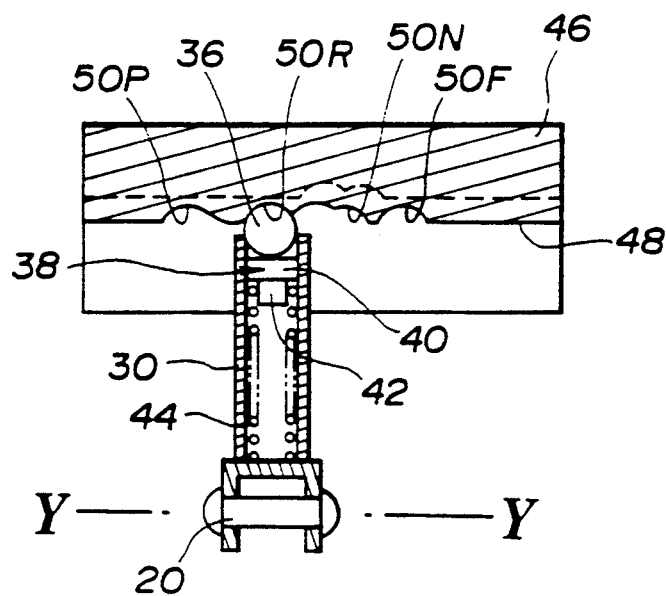
FIG. 4 is a sectional view of the shift apparatus, taken along the line 4—4 of FIG. 2, showing a check ball engaged with a recess 50R on a position plate.

As shown in FIG. 3, a bearing bracket 22 is secured to the shaft 14 so as to rotatably support a pivot pin 20. The pivot pin 20 has a second axis Y, as seen in FIG. 4, extending laterally with respect to the first axis X of the shaft 14. The pivot pin 20 is rotatable about the second axis Y. As seen in FIGS. 2 and 3, a channel-shaped bracket 24 is secured to the pivot pin 20 such that opposite ends of the pivot pin 20 project outwardly through opposite end walls of the bracket 24. The bracket 24 is disposed so as to straddle the bearing bracket 22 on the shaft 14 as seen in FIG. 3. Thus, the bracket 24 is supported on the shaft 14 so as to tilt or rotate about the second axis Y of the pivot pin 20.

A gear shift lever 26 is secured at its lower end 28 to the bracket 24 for unitary motion therewith. The gear shift lever 26 is tiltable about the second axis Y of the pivot pin 20 and rotatable about the first axis X of the shaft 14. Thus, the gear shift lever 26 is pivotable about the first and second axes X and Y to thereby movable in the longitudinal and lateral directions with respect to the vehicle body.

As seen in FIG. 2, a sleeve 30 is secured at its inner end 32 to the gear shift lever 26 and a slant side edge of the bracket 24. The sleeve 30 makes a unitary motion with the gear shift lever 26. The sleeve 30 has an outer end 34 at which a check ball 36 is supported by a ball seat 38 fitted into the sleeve 30. The ball seat 38 includes a body portion 40 contacting the check ball 36 and having a slightly smaller diameter than an inner diameter of the sleeve 30, and a neck portion 42 projecting inwardly from the body portion 40. Thus, the ball seat 38 is formed with an inside shoulder against which one end of a coil spring 44 bears. The other end of the coil spring 44 is disposed at the inner end 32 of the sleeve 30 such that the coil spring 44 is held compressed in the sleeve 30. The ball seat 38 is always urged outwardly by the coil spring 44 to push the check ball 36 outwardly in the sleeve 30.

As shown in FIG. 2, the check ball 36 is urged against a cam surface 48 of a position plate 46 stationarily mounted on the base plate 10. As seen in FIG. 3, the cam surface 48 is formed with a plurality of hemispherical recesses 50P, 50R, 50N, 50D, 50F and 50S positioned on loci which are drawn by the outer end 34 of the sleeve 30. The recesses 50P, 50R, 50N and 50F are formed on an outer arcuate line 60 while the recesses 50D and 50S are on an inner arcuate line 62.

As best shown in FIG. 3, the recesses 50P to 50S are mutually communicated with each other through guide grooves 52 intervened between the adjacent two thereof, for instance, the recesses 50R and 50N are communicated through the guide groove 52. The recesses 50P to 50S and the guide grooves 52 have respective depths determined by an angle which is made between the sleeve 30 and the cam surface 48 of the position plate 46.

The recesses 50P to 50S are engageable with the check ball 36 according to the shifting motion of the gear shift lever 26 along the cranked guide slot 110 of the console box 100. The cam surface 48 with the recesses 50P to 50S cooperates with the check ball 36 in such a manner as described below, for retaining the gear shift lever 26 in the respective operational shift positions "P" through "S" as seen in FIG. 1.

With the gear shift lever 26 positioned at the parking position "P", the check ball 36 on the sleeve 30 is engaged with the recess 50P as shown in FIG. 3. When the gear shift lever 26 is guided from the position "P" to the positions "R" and "N" along the longitudinal longer part 112 of the cranked guide slot 110 by rotating about the first axis X of the shaft 14, the check ball 36 is disengaged from the recess 50P and allowed to move toward the recess 50N on the outer arcuate line 60 as seen in FIG. 3. During this movement, the gear shift lever 26 is kept in an upright state as seen in FIG. 2. When the gear shift lever 26 is in the position "N" as seen in FIG. 1, the check ball 36 is engaged with the recess 50N as shown in FIG. 2. Then, when the gear shift lever 26 is guided from the position "N" to the position "D" along the lateral part 114 of the cranked guide slot 110 by tilting about the second axis Y of the pivot pin 20, the check ball 36 is allowed to move from the recess 50N to the recess 50D through the guide groove 52 therebetween. Subsequently, when the gear shift lever 26 is guided from the position "D" to the position "S" along the longitudinal shorter part 116 of the cranked guide slot 110 by rotating about the first axis X of the shaft 14 while being kept atilt about the second axis Y of the pivot pin 20, the check ball 36 is allowed to move from the recess 50D to the recess 50S on the inner arcuate line 62 as seen in FIG. 3.

Finally, when the gear shift lever 26 is guided from the position "S" to the position "F" along the lateral part 118 of the cranked guide slot 110 by tilting back about the second axis Y of the pivot pin 20 so as to return to the upright state, the check ball 36 is allowed to move from the recess 50S to the recess 50F.

During the entire movement of the gear shift lever 26 along the cranked guide slot 110, the check ball 36 on the sleeve 30 is always kept in contact with the cam surface 48 of the position plate 46. When the gear shift lever 26 is guided along the cranked guide slot 110 in reverse sequence, namely from the position "F" to the position "P", the check ball 36 cooperates with the cam surface 48 with the recesses 50P to 50F in same manner as mentioned above.

Further, the position plate may be replaced by one having another pattern of arrangement of the recesses, depending upon operational shift positions of the gear shift lever.

What is claimed is:

1. A gear shift apparatus, comprising:
a shaft having a predetermined first axis and rotatable about said predetermined first axis;
a bracket;
a gear shift lever secured to said bracket for unitary motion therewith;
a sleeve fixed to said gear shift lever for unitary motion therewith;
a check ball supported by said sleeve;
a stationary position plate with a cam surface cooperating with said check ball; and
means for supporting said bracket on said shaft for enabling tilting of the bracket and the gear shift lever about a second axis extending laterally with respect to said predetermined first axis in such a manner as to keep said check ball in contact with said cam surface.

2. The shift apparatus as claimed in claim 1, wherein:
said supporting means includes a pivot pin rotatable about said predetermined second axis and mounting said bracket, whereby said gear shift lever is tiltable about said predetermined second axis.

3. The shift apparatus as claimed in claim 1, wherein:
said cam surface has a plurality of recesses positioned on loci which are drawn by one end of said sleeve.

4. The shift apparatus as claimed in claim 3, wherein:
said recessed communicate with guide grooves formed in said cam surface so as to intervene between adjacent recesses.

5. The shift apparatus as claimed in claim 4, wherein:
said recesses and said guide grooves have respective depths which are related to angles which are made between said sleeve and said cam surface of said position plate for corresponding positions of the gear shift lever.

6. A gear shift apparatus, comprising:
a shift having a predetermined first axis and rotatable about said predetermined first axis;
a bracket;
a gear shift lever secured to said bracket for unitary motion therewith;
a sleeve fixed to said gear shift lever for unitary motion therewith;
a check ball supported by said sleeve;
a stationary position plate with a cam surface cooperating with said check ball; and
a pivot pin rotatably supported on said shaft about a second axis extending laterally with respect to said predetermined first axis, and fixedly mounting said bracket whereby said bracket and said gear shift lever are tiltable about said second axis.

7. The shift apparatus as claimed in claim 6, wherein:
said cam surface has a plurality of recesses positioned on loci which are drawn by one end of said sleeve.

8. The shift apparatus as claimed in claim 7, wherein:
said recessed communicate with guide grooves formed in said cam surface so as to intervene between adjacent recesses.

9. The shift apparatus as claimed in claim 8, wherein:
said recesses and said guide grooves have respective depths which are related to angles which are made between said sleeve and said cam surface of said position plate for corresponding positions of the gear shift lever.

* * * * *

UNITED STATES PATENT AND TRADEMARK OFFICE
CERTIFICATE OF CORRECTION

PATENT NO. : 5,309,784
DATED : May 10, 1994
INVENTOR(S) : Satoshi Kobayashi et al.

It is certified that error appears in the above-indentified patent and that said Letters Patent is hereby corrected as shown below:

Column 4, line 31, change "recessed" to --recesses--;
Column 4, line 59, change "recessed" to --recesses--.

Signed and Sealed this

Seventh Day of February, 1995

Attest:

BRUCE LEHMAN

Attesting Officer     Commissioner of Patents and Trademarks